United States Patent
Matuška et al.

(10) Patent No.: US 11,065,573 B2
(45) Date of Patent: Jul. 20, 2021

(54) AUTONOMOUS APPARATUS FOR EXTRACTING WATER FROM THE AIR

(71) Applicant: České vysoké učení technické v Praze, Dejvice (CZ)

(72) Inventors: Tomáš Matuška, Prague (CZ); Vladimír Zmrhal, Odolena Voda (CZ)

(73) Assignee: ČESKÉ VYSOKÉ UČENÍ TECHNICKÉ v PRAZE, Dejvice (CH)

( * ) Notice: Subject to any disclaimer, the term of this patent is extended or adjusted under 35 U.S.C. 154(b) by 253 days.

(21) Appl. No.: 16/449,961

(22) Filed: Jun. 24, 2019

(65) Prior Publication Data

US 2020/0009497 A1    Jan. 9, 2020

(30) Foreign Application Priority Data

Jul. 8, 2018    (CZ) ............................. CZ2018-337

(51) Int. Cl.
*B01D 53/06* (2006.01)
*B01D 53/04* (2006.01)
(Continued)

(52) U.S. Cl.
CPC ..... *B01D 53/0438* (2013.01); *B01D 53/0446* (2013.01); *B01D 53/0454* (2013.01);
(Continued)

(58) Field of Classification Search
CPC B01D 53/04; B01D 53/0438; B01D 53/0446; B01D 53/0454; B01D 53/06;
(Continued)

(56) References Cited

U.S. PATENT DOCUMENTS

| 4,043,934 A | 8/1977 | Shuler et al. |
| 4,180,985 A * | 1/1980 | Northrup, Jr. ........ F24F 3/1423 62/94 |

(Continued)

FOREIGN PATENT DOCUMENTS

| JP | 61-212310 | * | 9/1986 |
| JP | 61-212311 | * | 9/1986 |

(Continued)

OTHER PUBLICATIONS

Examination Report No. 1 dated Jun. 15, 2020, by the Australian Patent Office in corresponding Australian Patent Application No. 2019204433. (6 pages).

(Continued)

*Primary Examiner* — Frank M Lawrence, Jr.
(74) *Attorney, Agent, or Firm* — Buchanan Ingersoll & Rooney PC

(57) ABSTRACT

An apparatus for extracting water from ambient air is disclosed comprising an air duct for the process air, an air duct for the regeneration air and a sorption exchanger moving at least partially between the two air ducts. Additionally, in the air duct for the regeneration air, on the side facing the sorption exchanger outlet, a cooler is installed, and on the side facing its inlet, a heater is installed. The apparatus also comprises a closed refrigerant circuit. The cooler for cooling the regeneration air is a refrigerant evaporator and this cooler is, by the refrigerant piping via a compressor for the evaporated refrigerant suction and compression, connected to the regeneration air heater, where this heater for heating the regeneration air is a condenser for condensing the refrigerant vapor. The apparatus also comprises a subcooler for additional heat removal from the refrigerant.

15 Claims, 3 Drawing Sheets

(51) Int. Cl.
*B01D 53/26* (2006.01)
*E03B 3/28* (2006.01)

(52) U.S. Cl.
CPC .............. *B01D 53/261* (2013.01); *E03B 3/28* (2013.01); *B01D 2257/80* (2013.01); *B01D 2259/4009* (2013.01)

(58) Field of Classification Search
CPC .............. B01D 53/261; B01D 2257/80; B01D 2259/4009; Y02A 20/00; E03B 3/28; F24F 3/1423; F24F 2203/1032
USPC ...... 95/10, 113, 117, 123, 124; 96/111, 125, 96/144, 146; 34/80, 472, 473
See application file for complete search history.

(56) References Cited

U.S. PATENT DOCUMENTS

| | | | |
|---|---|---|---|
| 7,043,934 B2 | 5/2006 | Radermacher et al. | |
| 7,601,208 B2 | 10/2009 | Tongue | |
| 9,134,038 B2* | 9/2015 | Lee .......................... | F24F 11/30 |
| 2004/0244398 A1* | 12/2004 | Radermacher ............ | E03B 3/28 |
| | | | 62/285 |
| 2006/0272344 A1 | 12/2006 | Tongue | |
| 2007/0028769 A1 | 2/2007 | Eplee et al. | |
| 2007/0101862 A1 | 5/2007 | Tongue | |
| 2008/0168789 A1 | 7/2008 | Jones et al. | |
| 2010/0300123 A1* | 12/2010 | Park ...................... | F24F 12/003 |
| | | | 62/94 |
| 2011/0296858 A1 | 12/2011 | Caggiano | |
| 2013/0036913 A1* | 2/2013 | Fukudome ............ | F24F 3/1423 |
| | | | 96/118 |
| 2014/0165637 A1* | 6/2014 | Ma ........................ | F24F 3/1423 |
| | | | 62/186 |
| 2018/0171604 A1 | 6/2018 | Kim et al. | |

FOREIGN PATENT DOCUMENTS

| | | |
|---|---|---|
| WO | 01/84066 A1 | 11/2001 |
| WO | 2016/033544 A1 | 3/2016 |

OTHER PUBLICATIONS

Notice of Acceptance dated Feb. 5, 2021, by the Australian Patent Office in corresponding Australian Patent Application No. 2019204433. (4 pages).

Examination Report dated Mar. 15, 2019, by the Industrial Property Office of the Czech Republic in corresponding Czech Patent Application No. PV 2018-337 and an English-language machine translation of the Report. (4 pages).

Grant of Patent dated May 15, 2019, by the Industrial Property Office of the Czech Republic in corresponding Czech Patent Application No. PV 2018-337 and an English-language machine translation of the Grant (7 pages).

Examination Report dated Dec. 20, 2020, by the Gulf Cooperation Council Patent Office in Gulf Cooperation Council Patent Application No. GV 2019-37885. (3 pages).

Search Report dated Mar. 14, 2019, by the Industrial Property Office of the Czech Republic in corresponding Czech Patent Application No. PV 2018-337. (3 pages).

* cited by examiner

AUTONOMOUS APPARATUS FOR EXTRACTING WATER FROM THE AIR

CROSS REFERENCE TO RELATED APPLICATION

This application claims priority to Czech Patent Application No. 2018-337 filed on Jul. 8, 2018, the entire contents of which are incorporated herein by reference.

TECHNICAL FIELD OF THE DISCLOSURE

The disclosure relates to an apparatus which allows one to obtain water from the ambient air. The principle of the apparatus' function is to humidify the regeneration air drawn from ambient environment by the moisture content of the process air abstracted from the environment at a higher flow rate than the regeneration air flow rate. A sorption material is used to humidify the regeneration air, moving alternatively between the process and regeneration air. To release water vapor from the sorption material, the heat taken from cooling the regeneration air is used. Because of the recuperating energy among the single parts of the apparatus and by utilizing energy from the ambient environment, the apparatus allows one to obtain more water with less energy than by conventional condensing and sorption equipment, and to achieve a high degree of autonomous operation. The apparatus is designed primarily for dry, warm climatic areas with low water vapor content in the air but can also operate with high efficiency in damp climatic areas.

BACKGROUND

In the field of water extraction from the air, a number of devices are available which operate on the principle of cooling the ambient air by a heat exchanger with a temperature below the dew point, where the water vapor from the air is condensed on its surface in the form of water droplets. The disadvantage of such a solution is that in the case of the low specific humidity of the ambient air, i.e., below 5 g/kg of dry air, the production of water is very low and is also energy intensive. Therefore, to extract water from ambient air in dry areas, devices for moisture sorption into the sorption material have been developed.

The device, according to U.S. Pat. No. 7,043,934B2, for the extraction of water from the air utilizes a sorption system to capture the moisture from the cold and dry outdoor air and, subsequently, a cooling device (compressor or absorption) is used to condense the moisture into liquid water. To regenerate the sorption exchanger, it introduces various heat sources from the exhaust gases waste heat to the heat from the solar collectors. The source of electricity for the operation can be photovoltaic cells. The disadvantage is the high energy demand, because heat recovery from cooling is not used.

The device, according to patent US2006/0272344A1, utilizes a sorption system based on a sorption wheel with a solid desiccant with a closed regeneration circuit. To regenerate the desiccant, waste heat from a combustion engine of a mobile device is used. The dehumidified process air exiting the sorption wheel serves as a source of the cold for the condenser exchanger where water vapor is precipitated from the humidified warm air. The disadvantage of such a device is that it can only operate in cold areas or wet areas so that the dehumidified process air temperature is sufficiently below the dew point temperature of the humidified air and condensation occurs in the cooler.

The device, according to U.S. Pat. No. 7,601,208, utilizes a desiccant system based on a liquid desiccant, which removes the moisture from the air by spraying. Water is subsequently expelled from the desiccant solution by the waste heat from the combustion engine of a mobile device. The water vapor condenses in the cooler, where the source of the cold is the ambient air drawn in. The disadvantage of such a device is that it can only operate in cold areas or wet areas where the ambient air temperature is sufficiently below the dew point temperature of the humidified air and condensation occurs in the cooler.

The device, according to patent US 2011/0296858, utilizes a desiccant system with a sorption wheel with a solid desiccant. The ambient air passes through the sorption wheel and part of the water vapor content is adsorbed on the desiccant surface. The dehumidified air is then heated in a microwave chamber to a high temperature and returned to a part of the sorption wheel to regenerate it. The heated air removes the moisture from the desiccant surface and is directed to a cooler, where the water vapor condenses. There is no clear benefit from the scheme as the device operates at a constant flow rate of the process and regeneration air, and there is no increase in the moisture content in the air prior to condensation.

The disadvantage of these solutions is the limited range of use in either high humidity or low temperature ambient air areas. In dry warm areas such as deserts, such devices exhibit low water production or a high demand for an external (non-renewable) energy supply. None of the devices has the potential for autonomous operation using energy from the ambient environment or uses energy recovery within the device itself.

SUMMARY

These drawbacks are eliminated by the present disclosure of the apparatus for water extraction from the ambient air, which allows water to be extracted from the air with high efficiency, even in dry and warm climates, while the operation of the apparatus can be, in a specific embodiment, completely independent of an external energy supply, relying on the energy recovery within the apparatus and the local renewable energy supply, such as solar energy, energy from the ambient environment, wind energy, etc.

The apparatus comprises an air duct for process air and an air duct for regeneration air. The air duct for the process air has a process air inlet at one end and a process air outlet at the other end, and the air duct for the regeneration air has a regeneration air inlet at one end and a regeneration air outlet at the other end. All these inlets and outlets are connected to the ambient environment. The apparatus further comprises a sorption exchanger which is positioned at least partially in at least one of the air ducts and is movable in such a manner that at least part of its volume is movable between the two air ducts, wherein the space is allocated for positioning the sorption exchanger in both air ducts. A first suction device is located in the air duct for the process air and a second suction device is located in the air duct for the regeneration air. An air heater for heating the regeneration air and a cooler for cooling the regeneration air are also positioned in the air duct for the regeneration air in such a manner that the space for the sorption exchanger is located between the heater and the cooler. The second suction device is located anywhere in the air duct for the regeneration air so that it draws the air in the direction from the heater to the cooler. The apparatus also comprises an element for the collection of the condensed water from the regeneration air on the cooler.

The essential feature of this apparatus is that it also contains a closed refrigerant circuit comprising a refrigerant and refrigerant piping, where, in the cooler for cooling the regeneration air, there is a refrigerant evaporator and this cooler is connected by the refrigerant piping, via a compressor for the suction and compression of the evaporated refrigerant, to the heater for heating the regeneration air. This heater for regeneration air heating is a condenser for condensing the refrigerant vapor. The apparatus also comprises a subcooler for additional heat removal from the refrigerant, which is connected to the heater through the refrigerant piping and is also connected via an expansion valve to the cooler.

It is advantageous, if the air duct for the regeneration air is oriented in such a manner that the regeneration air inlet is closer to the process air outlet than to the process air inlet. It is advantageous, if the first suction device is placed in the air duct for the process air so that it draws air in the direction from the process air inlet to the process air outlet and when the second suction device is placed in the air duct for the regeneration air in such a manner that it draws air in the direction from the regeneration air inlet to the regeneration air outlet.

In a preferred embodiment, the air duct for process air is connectable to the air duct for the regeneration air by means of a connecting part, wherein this part comprises an openable flap to divert the air flow from the air duct for the regeneration air to the air duct for the process air. The connecting part with the flap opens into the air duct for the regeneration air in the area between the cooler and the regeneration air outlet. This connecting part with the flap then opens into the air duct for the process air in the area between the sorption heat exchanger location and the process air inlet. The apparatus further comprises a measuring device (not shown) for measuring the water vapor content in both air ducts, which is further connected to a control device (not shown) for opening and closing the flap. This measuring device is installed to measure the water vapor content in the air duct for the regeneration air between the cooler and the regeneration air outlet and in the air duct for the process air at the process air inlet. The regeneration air outlet is, in this embodiment, closable and is interconnected with a control device (not shown) for opening and closing this outlet, which is directly, or through other elements, interconnected to a control device for opening and closing the flap.

In another preferred embodiment, the apparatus also comprises a liquid and a liquid piping, wherein the liquid piping is separate from the refrigerant piping.

It is advantageous, if a first liquid-to-air exchanger is inserted in the air duct for the regeneration air in the direction of airflow downstream of the heater, said first liquid-to-air exchanger being further connected to a heat accumulator by the liquid piping.

It is advantageous, if solar thermal collectors and/or glazed solar photovoltaic-thermal collectors are connected to the heat accumulator by the liquid piping, and in the case glazed solar photovoltaic-thermal collectors are present, these glazed solar photovoltaic-thermal collectors are also electrically interconnected to a battery storage unit.

It is also advantageous, if a second air-to-liquid heat exchanger connected by the liquid piping to a cold storage accumulator is inserted in the air duct for the regeneration air downstream, in the air flow direction, of the sorption heat exchanger space and concurrently upstream of the condenser.

In yet another preferred embodiment, the cold accumulator is connected to an outdoor liquid cooler and/or large surface plate heat exchangers and/or unglazed solar photovoltaic-thermal collectors by the liquid piping, wherein if the unglazed solar photovoltaic-thermal collectors are present, these unglazed solar photovoltaic-thermal collectors are concurrently electrically interconnected to the battery storage unit.

It is also advantageous, if, in the direction of the airflow, a third liquid-to-air heat exchanger is inserted downstream of the cooler into the air duct for the regenerating air, said third liquid-to-air heat exchanger being connected by the liquid piping to the cold accumulator or directly to the second air-to-liquid heat exchanger.

It is advantageous, if the power of the second suction device is lower than the power of the first suction device, typically the power of the second suction device being one half to one quarter of the power of the first suction device.

The subcooler is advantageously located in the air duct for the process air between the space for the sorption exchanger and the process air outlet.

It is also advantageous, if the first suction device is located between the sorption exchanger space and the process air outlet and when the second suction device is located between the cooler and the regeneration air outlet. When a third liquid-to-air exchanger is present, this second suction device is located in the direction of the airflow downstream of this third liquid-to-air exchanger and concurrently upstream of the regeneration air outlet.

The apparatus comprises a sorption exchanger which is, with an advantage, rotary.

The collection element for the water condensed from the regeneration air on the cooler is usually a condensed water collecting vessel located under the cooler and/or the second air-to-liquid exchanger, if used.

Other advantages of the apparatus will be apparent from the detailed description of the preferred embodiments.

BRIEF DESCRIPTION OF THE DRAWINGS

The disclosure will be explained in more detail with reference to the drawings.

DETAILED DESCRIPTION OF THE PREFERRED EMBODIMENTS

It will be understood that the following specific examples of the embodiments of the disclosure described and illustrated below are presented to illustrate, but not to limit the embodiments of the disclosure to the examples demonstrated hereinafter. Persons skilled in the art will find or will be able to determine, using routine experimentation, a greater or lesser number of equivalents to the specific embodiments of the disclosure specifically described hereinafter. Also, these equivalents fall within the scope of the appended claims.

Figure 1:
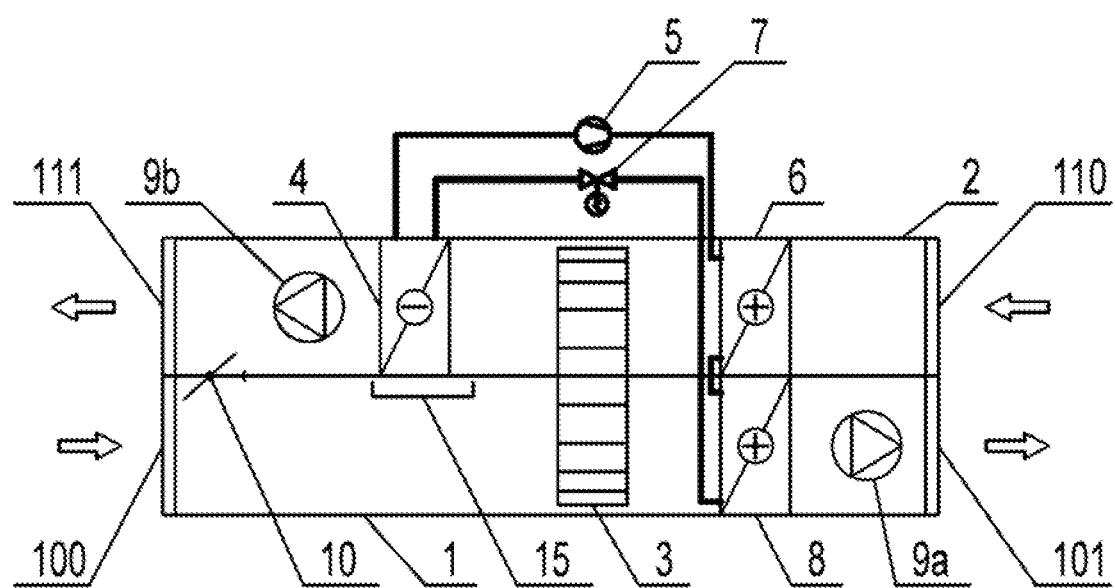
FIG. 1 is a schematic cross-sectional view of a major portion of the apparatus in one possible embodiment.

FIG. 1 shows a schematic sectional view of the main part of the apparatus in one preferred embodiment. An air duct 1 for the process air and an air duct 2 for the regeneration air are visible. The air duct 1 for the process air has a process air inlet 100 at one end and a process air outlet 101 at the other end. Similarly, the air duct 2 for the regeneration air has a regeneration air inlet 110 at one end and a regeneration air outlet 111 at the other end. All these inlets 100, 110 and outlets 101, 111 are connected to the ambient environment. A sorption exchanger 3 is inserted between the air ducts. This exchanger is in an advantageous embodiment rotary-type, typically with a solid sorption material that adsorbs the water vapor from the air. However, a rotary motion is not a prerequisite, for example a sliding sorption exchanger could work. In particular, it is important that the sorption exchanger 3 is movable in such a manner that at least a part of its volume is movable between the two air ducts 1 and 2. The ratio of the parts of the sorption exchanger 3 which are at some point in the individual air ducts 1 and 2 may vary. In an advantageous embodiment, three quarters of the volume of the sorption exchanger is at all times positioned in the air flow in air duct 1 for the process air and one quarter of the volume of the sorption exchanger 3 is positioned in air duct 2 for the regeneration air. In both air ducts 1 and 2, space is allocated for the positioning of this sorption exchanger 3. In the advantageous embodiment with a rotary sorption exchanger 3, as shown in FIG. 1, the exchanger rotates about an axis parallel to the axes of the two air ducts, and parts of its volume alternately move between the air streams in the air duct 1 for process air and in the air duct 2 for the regeneration air. A first suction device 9a is located in the air duct 1 for the process air, typically a fan, and a second suction device (9b) is located in the air duct 2 for regeneration air. Both suction devices 9a, 9b serve to provide the forced air flow. It can be seen that in the air duct 2 for the regeneration air, a heater 6 is also provided for heating the regeneration air, and a cooler 4 having a surface temperature below the dew point for cooling the regeneration air. The space for positioning the sorption exchanger 3 is located between the heater 6 and the cooler 4. In FIG. 1, the sorption exchanger 3 is directly shown at this location. The second suction device 9b is located anywhere in the air duct 2 for the regeneration air so that it draws air in the direction from heater (6) to cooler (4). The apparatus also includes an element 15 for the collection of water condensed from the regeneration air, which in a preferred embodiment condenses on the cooler 4, eventually on the air-to-liquid exchanger 30 (see FIG. 2), if used. In FIG. 1, the airflow directions in the two air ducts 1 and 2 are shown by arrows. Throughout this disclosure, where the inlets and outlets of the various parts of the apparatus are mentioned, the inlets always refer to the parts where the air flow enters, and the outlets refer to the parts where the air flow exits.

One of the innovative features of the apparatus is that it also contains a closed refrigerant circuit comprising a refrigerant and refrigerant piping, which is used to recover heat from the cooling of the regeneration air. Advantageously, the R134a mixture is used as a refrigerant, but other substances may be used. In the cooling circuit, a cooler 4 for cooling the regeneration air and a heater 6 for heating the regeneration air are installed, said cooler 4 works as a refrigerant evaporator and said heater 6 works as a condenser for condensing the refrigerant vapor. At the same time, the cooler 4 for cooling the regeneration air is connected to the heater 6 for heating the regeneration air via the refrigerant piping through a compressor 5 used for the suction and compression of the evaporated refrigerant. Since the thermal power pumped by the refrigerant circuit is greater than the power required to heat the regeneration air in the heater 6, downstream of the heater 6, a subcooler 8 is also installed in series, for additional heat removal from the refrigerant. This subcooler 8 is connected not only to the heater 6 via the refrigerant piping but is also connected by another refrigerant piping branch via an expansion valve 7 to the cooler 4. An example of such a connection is also shown in FIG. 1.

It is advantageous, if the subcooler 8 is located in the air duct 1 for the process air between the space for the placement of the sorption exchanger 3 and the process air outlet 101, as shown in FIG. 1.

The first suction device 9a operates most effectively when positioned as shown in FIG. 1, i.e., between the sub-cooler (8) and the processing air outlet (101). In the most efficient embodiment, the second suction device (9b) is located between the cooler (4) and the regenerating air outlet (111), as shown in FIG. 1.

It is also advantageous, if the air duct 2 for the regeneration air is oriented in such a manner that the regeneration air inlet 110 is closer to the process air outlet 101 than to the process air inlet 100 and when the first suction device 9a is located in the air duct 1 for the process air in such a manner that it draws air in the direction from the process air inlet 100 toward the process air outlet 101 and when the second suction device 9b is located in the air duct 2 for the regeneration air in such a manner that it draws air in the direction from the regeneration air inlet 110 to the regeneration air outlet 111. It is most advantageous, in terms of the geometry and energy efficiency, when the two air ducts are parallel, close to each other and countercurrent as shown in FIG. 1. However, none of the above configurations is a prerequisite, the apparatus may also function with the air ducts at a distance from each other, their axes may be at any angle, and the flow may be oriented in any direction. However, this is, in most cases, disadvantageous in terms of both the geometry and heat transfer.

FIG. 1 also shows an advantageous embodiment in which the air duct 1 for the process air is connectable to the air duct 2 for the regeneration air via a connecting part, wherein the part comprises an openable flap 10 for diverting the air flow from the air duct 2 for the regeneration air into the air duct 1 for the process air. The connecting part with flap 10 opens into the air duct 2 for the regeneration air in the area between the cooler 4 and the regeneration air outlet 111 and opens into the air duct 1 for the process air in the area between the space for the sorption exchanger 3 and the process air inlet 100. FIG. 1 illustrates the most advantageous embodiment of the connection part with flap 10, wherein the air ducts 1 and 2 are positioned close to each other and the connecting part thus comprises only the flap 10. In the case that the air ducts 1 and 2 would be more distant from each other than shown in FIG. 1, the connecting part would comprise an additional air duct in which the flap 10 would be located.

Flap 10 is connected to a control device for opening and closing the flap 10, which is further connected to a measuring device which measures the water vapor content in both air ducts 1 and 2. This measuring device is installed in such a manner that it measures the water vapor content in the air duct 2 for the regeneration air between the cooler 4 and regeneration air outlet 111 and in the air duct 1 for the process air in the process air inlet 100 or in the proximity of this inlet.

The regeneration air outlet 111 is closable and is connected to a control device for opening and closing this regeneration air outlet 111, which is connected directly, or via other elements, to the control device for opening and closing the flap 10 or is interconnected with a measuring device for measuring the water vapor content in both air ducts 1 and 2. This measuring device for measuring the water vapor content can be the same as the one which is interconnected to the control device for opening and closing the flap 10.

In the most advantageous embodiment, the flap 10 has only two positions, i.e., opened and closed, and in case that it is opened, and concurrently with this opening, the regeneration air outlet 111 closes, the entire air flow from air duct 2 for regeneration air is diverted to the air duct 1 for the process air. It is also advantageous if the flow rate through the process air inlet 100 is controllable. Thereby, it is possible to reduce the quantity of the dry air intake from the ambient air through the process air inlet 100 to the air duct 1 for the process air by the amount of air supplied through the connecting part with flap 10 from the air duct 2 for the regeneration air.

If the specific humidity of the regeneration air at the outlet from the cooler 4 is higher than in the process air inlet 100 by a set value, typically 0.5 g/kg of dry air, the flap 10 opens and at the same time the regeneration air outlet 111 is closed. This function increases the annual water production by about 10% in a typical desert climate.

The ambient air is drawn through the process air inlet 100 into the air duct 1 for the process air by means of the first suction device 9a. The process air then flows through the sorption exchanger 3 and the water molecules contained in the air are adsorbed on the surface of the solid sorption material in this exchanger. The dehumidified process air is slightly heated by the heat released by the adsorption of the water molecules and enters the subcooler 8, where it removes the residual heat from the refrigerant circuit and further exits to ambient environment through the process air outlet 101. The second suction device 9b draws the ambient air into the air duct 2 for the regeneration air through the regeneration air inlet 110 at a lower flow rate, typically one half to one quarter of the process air flow rate, and is heated in the heater 6 to a high temperature over 65° C. For this purpose, the power of the second suction device 9b is lower than the power of the first suction device 9a, typically the power of the second suction device 9b is half to a quarter of the power of the first suction device 9a. The high temperature of the regeneration air allows for the effective drying and, thus, the regenerating of the solid sorption material surface in the sorption exchanger 3 in the air duct 2 for the regeneration air. The water vapor molecules pass through the channels in the sorption exchanger 3 from the sorption material surface to the heated air and humidify it. When using the sorption exchanger 3 of a rotary design, the volume of the sorption exchanger 3 is moved by the uniform rotation between the two air ducts 1 and 2. In three quarters of the sorption exchanger 3 volume, the moisture is removed from the process air and the sorption material is moistened, and in one quarter of the sorption exchanger 3 volume, the sorption material is dried by the heated regeneration air and the regeneration air is moisturized. The moistened warm regeneration air is conducted to the cooler 4 with a surface temperature below the regeneration air dew point. Water vapor condenses on the surface of the cooler in the form of water droplets that flow into the element 15 for the water collection, from where the water can be discharged for further use. If a second air-to-liquid exchanger 30 is added, condensation may already occur on this exchanger if its surface temperature is below the regeneration air dew point. Typically, however, the second air-to-liquid exchanger 30 serves only to pre-cool the air due to a higher surface temperature.

It is important for the operation of the disclosure that the heat recovery is applied in the air duct 2 for the regeneration air by a refrigerant circuit. The compressor 5 draws the refrigerant vapor at low pressure and a temperature below 10° C. from the cooler 4 for cooling the regeneration air, the cooler 4 works as a refrigerant evaporator, and pumps it to a higher pressure at temperatures above 65° C. to the heater 6 for heating the regeneration air. The refrigerant vapor in the heater 6 cools down and partially condenses to a liquid state and transfers the heat through the heater 6 to the regeneration air. In this way, the refrigerant circuit pumps heat between the regeneration air outlet from the sorption exchanger 3 and the regeneration air inlet into the sorption exchanger 3. The regeneration air is heated in the heater 6 by the heat recovered from the cooling of the regeneration air during the condensation of the water on the cooler 4, which greatly contributes to the energy savings compared to the state-of-the-art devices, not applying such a recovery. The air heated in this way in the heater 6 is then used to regenerate part of the sorption exchanger 3 currently located in the air duct 2 for the regeneration air. Due to the higher temperature of the regeneration air heated by the heater 6, desorption of the adsorbed water vapor molecules occurs in the sorption exchanger 3, thereby regenerating part of the desiccant currently placed in air duct 2 for the regeneration air. In addition, the heat recovered from the cooling of the air during the condensation of the water on the cooler 4 is supplied to the subcooler 8 as residual heat, which is necessary for the balance between the heat power removed from the cooler 4 and the heat power required for the heater 6. The advantage in this particular embodiment is that, for the necessary residual heat removal from the refrigerant circuit, the process air with a sufficiently high flow rate is used, for which there is neither any further use, nor the requirements for its properties such as temperature and humidity, and it is discharged to the ambient environment.

When operating the apparatus in the dry ambient air, occurring typically in deserts, the specific humidity at the outlet of the regeneration air cooler 4 may be higher than the specific humidity of the drawn ambient air, and/or the regeneration air temperature at the outlet from the cooler 4 may also be concurrently lower than the drawn ambient air temperature, which affects the dehumidification performance. Therefore, the preferred embodiment is such, where the air ducts for the waste regeneration air and the drawn-in process air are interconnected by an openable mixing flap 10 or by a connecting part comprising this flap 10. This arrangement was described above. In case the measuring device records a higher water vapor content in the air duct 2 for the regeneration air at a point upstream of the regeneration air outlet 111, compared to the water vapor content in air duct 1 for the process air at a point downstream of the process air inlet 100, the control device for opening and closing the flap 10 opens the flap 10 and concurrently the control device for opening and closing the regeneration air outlet 111 closes the outlet 111. Thus, the entire regeneration air stream with higher water vapor content is mixed with the process air, thereby increasing its water vapor content and increasing the efficiency of the plant. At the same time, it is advantageous to maintain the same process air flow rate entering the sorption exchanger 3 by the air flow regulation, meaning the process air flow rate drawn through the process air inlet 100 is reduced by the regeneration air flow rate through the flap 10.

The heat recovery by the refrigerant circuit enables a significant reduction in the area of the supplemental elements used and, thus, the achievement of autonomy with significantly lower investment costs. The main part of the apparatus allows, when the overall utilization of the ambient air is of 3500 m³/h (i.e. of 2700 m³/h for the process air and of 800 m³/h for the regeneration air), to produce 260 liters of water a day in a typical desert environment with an average specific air moisture content of about 5 g/kg of dry air, compared to conventional single-stage cooler condensers on the market with a production of about 35 liters of water per day with the same total ambient air flow rate and the same cooling performance.

While in a typical desert environment, the performance of water production of the present apparatus is about 20 times better than in the conventional condensing units based on single stage coolers, in a humid climate with an average specific moisture content of about 15 g/kg of dry air, the present apparatus is about 5 times more effective.

Figure 2:
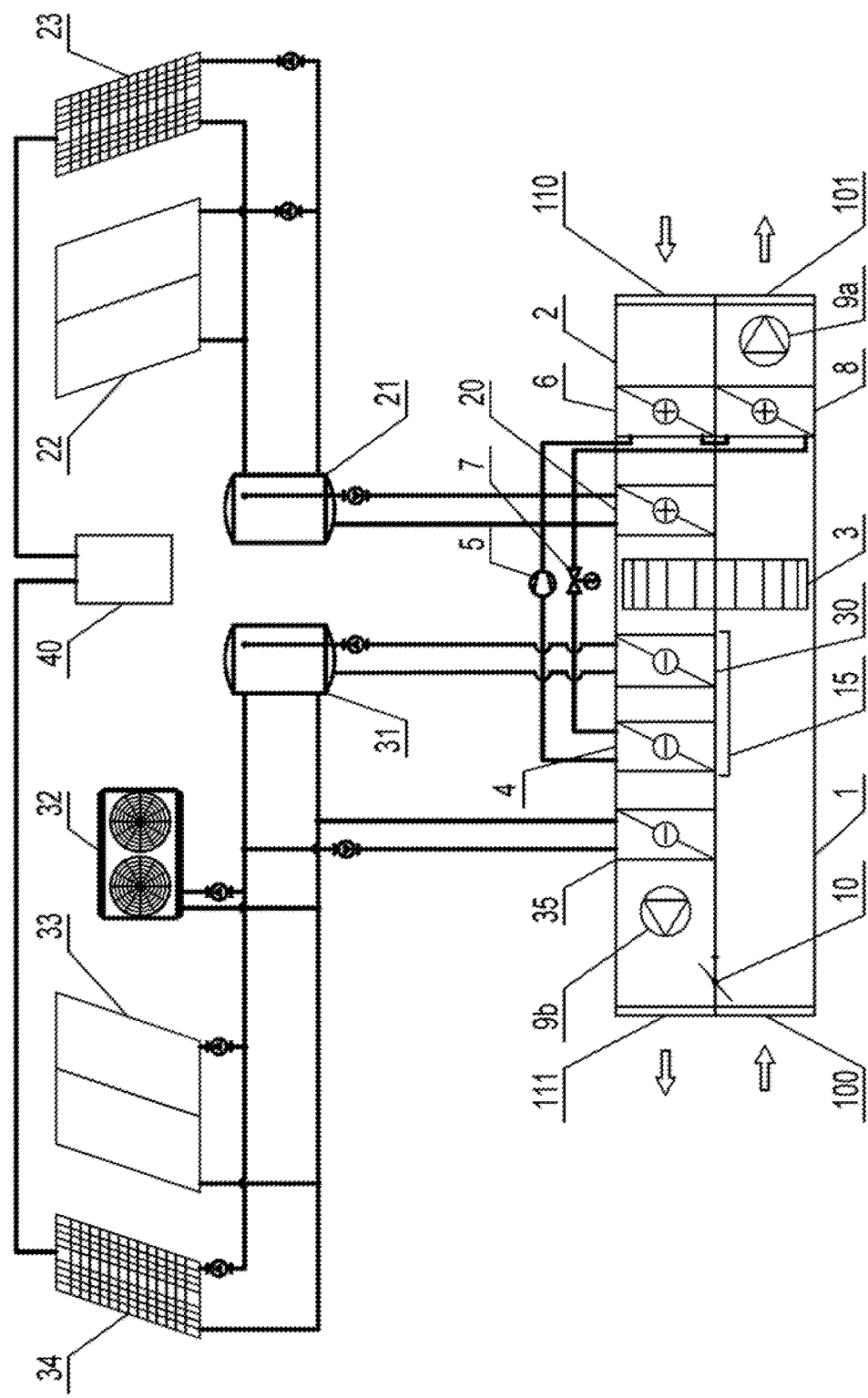
FIG. 2 is a schematic representation of the apparatus with supplementary elements to further reduce the energy consumption.

FIG. 2 shows the main part of the apparatus described above, supplemented by other elements reducing its energy demand and allowing the plant to operate autonomously using only the energy from the ambient environment.

For this purpose, the apparatus is supplemented by liquid piping with a liquid, fitted with supplementary elements, the liquid piping being separate from the refrigerant piping.

The liquid used in the liquid piping is typically water. Energy from ambient environment is then utilized by supplementary elements, such as solar thermal collectors 22, glazed solar photovoltaic-thermal collectors 23, and used for the regeneration air heating, and with supplementary elements such as outdoor liquid coolers 32, large surface plate heat exchangers 33, unglazed solar photovoltaic-thermal collectors 34 used for the regeneration air cooling.

To reduce the energy consumption of the refrigerant circuit with the compressor 5, it is advantageous if downstream of heater 6 in the air duct 2 for regeneration air, a first liquid-to-air exchanger 20 is installed to heat the air to a higher temperature than in the heater 6 by the heat from the solar thermal collectors 22 and/or glazed solar photovoltaic-thermal collectors 23. The glazed solar photovoltaic-thermal collectors 23 at the same time, produce heat for heating the air and electrical energy to drive the compressor 5 and the suction devices 9a, 9b, and also potentially the other installed electrically driven elements.

The first liquid-to-air heat exchanger 20 is, for this purpose, connected by the liquid piping to a heat accumulator 21, typically a water heat accumulator, into which the heat from the solar thermal collectors 22 is supplied by the liquid piping and/or from the glazed solar photovoltaic-thermal collectors 23. During the day, the heat accumulator 21 accumulates heat from solar thermal collectors 22 and/or the glazed solar photovoltaic-thermal collectors 23 and this heat is used by the first liquid-to-air heat exchanger 20 for heating the regeneration air by the first liquid-to-air heat exchanger 20 in the air duct 2 for the regeneration air.

If glazed solar photovoltaic-thermal collectors 23 are installed, these glazed solar photovoltaic-thermal collectors 23 are also electrically connected to the battery storage unit 40.

To further reduce the energy consumption, a second air-to-liquid heat exchanger 30 to precool the regeneration air before entering the cooler 4 can be inserted in the air duct 2 for the regeneration air, in the direction of air flow, downstream of the sorption exchanger 3 space position and concurrently upstream of the cooler 4. This second air-to-liquid heat exchanger 30 is connected to a cold accumulator 31, typically a water accumulator, by the liquid piping. By means of the second air-to-liquid heat exchanger 30, heat is removed from the regeneration air to the outside of the air duct 2 for the regeneration air.

Heat is removed via the liquid piping from the cold accumulator 31, for example to an outdoor liquid cooler 32 equipped with a fan and/or to large surface plate heat exchangers 33 and/or to unglazed solar photovoltaic-thermal collectors 34, where in the case when unglazed photovoltaic-thermal collectors 34 are installed, these unglazed solar photovoltaic-thermal collectors 34 are also electrically connected to the battery storage unit 40.

When large surface plate heat exchangers 33 are used to remove heat from the cold accumulator 31, the heat radiation towards the night sky is used in particular to remove the heat from the liquid. In another advantageous embodiment, unglazed solar photovoltaic-thermal collectors 34 are used to remove heat from the cold accumulator 31, utilizing, for this heat removal, during the night time, the radiation towards the night sky and producing, during the day time, electricity to drive the compressor 5, the suction devices 9a, 9b, and possibly the other installed electrical elements.

In another preferred embodiment, to operate the apparatus at night or during the low actual supply from the renewable sources, i.e., typically from glazed solar photovoltaic-thermal collectors 23 and/or from unglazed solar photovoltaic-thermal collectors 34, a battery storage unit 40 is used where the electrical energy from these solar sources is accumulated, also possibly from other sources of available renewable energy sources usable to generate electricity instead of the glazed solar photovoltaic-thermal collectors 23 and/or non-glazed solar photovoltaic-thermal collectors 34. Typical examples are photovoltaic modules or wind power plants.

Heat from the cold accumulator 31 can also be directed to a third liquid-to-air exchanger 35 in order to heat the regeneration air. This third liquid-to-air exchanger 35 is inserted into the air duct 2 for the regeneration air in the airflow direction downstream of the cooler 4. Its connection to the cold accumulator 31 is also implemented by the liquid piping. Thereby, it is possible to recover the cold from the cooled regeneration air after the condensation of the water in the cooler 4 to pre-cool the regeneration air by a second air-to-liquid exchanger 30 by means of the cold accumulator 31.

Other ways of recovering the cold from the cooled regeneration air can be implemented. For example, by connecting the third liquid-to-air exchanger 35 via the liquid piping with liquid directly to the second air-to-liquid exchanger 30 without using the cold accumulator 31 (see FIG. 3).

The surface of the elements, such as the solar thermal collector 22, glazed solar photovoltaic-thermal collector 23, large surface plate heat exchanger 33 or unglazed solar photovoltaic-thermal collector 34, as well as the volume of the heat accumulator 21, the cold accumulator 31, or the battery storage unit 40 capacity, are determined by the local conditions, the user's demand for the volume of water produced and the degree of the facility autonomy required.

The supplemental elements, in conjunction with the cold accumulator 31 reduce the required cooling circuit power by about 30% and, thus, the annual electricity demand.

Other liquid-to-air or air-to-liquid exchangers as well as other refrigerant circuits with other heaters and coolers can also be added to the apparatus, in addition to those specifically mentioned herein.

Due to the elements shown in FIG. 2, provided in addition to the embodiment shown in FIG. 1, an autonomous operation, i.e., operation independent of a remote power supply, can be achieved. At the same time, it is possible to achieve high efficiency because it manages energy very economically. This makes a big difference compared to the known solutions usually relying on photovoltaic systems use only, or possibly in combination with the accumulation of electrical energy in batteries, and its withdrawal from the batteries during actual low electricity production. In comparison, the solution of the present disclosure additionally accumulates the cold from the ambient environment at night, which is then used during the day to cool the air in the air duct 2 for the regeneration air, thereby reducing the energy demand of the compressor 5. Similarly, during the day, the apparatus absorbs heat from the solar radiation and accumulates it so that it can be used to heat air in the air duct 2 for the regeneration air to a higher temperature level, thereby increasing the water production of the apparatus while reducing the energy demand of the compressor 5. For both purposes, photovoltaic-thermal collectors can be used. For the production of cold at night, unglazed solar photovoltaic-thermal collectors (34) are used, optimally in combination with the cold accumulator 31, for the production of heat in day time, glazed solar photovoltaic-thermal collectors 23 are used, optimally in combination with the heat accumulator 21.

Element 15 for the collection of the water condensed from the regeneration air on the cooler 4 is most often a condensed water collecting vessel located below the cooler 4 and/or the second air-to-liquid exchanger 30, when installed. However, water can also be collected in other ways, e.g., into a pipe from which it discharges at the place of consumption.

Figure 3:
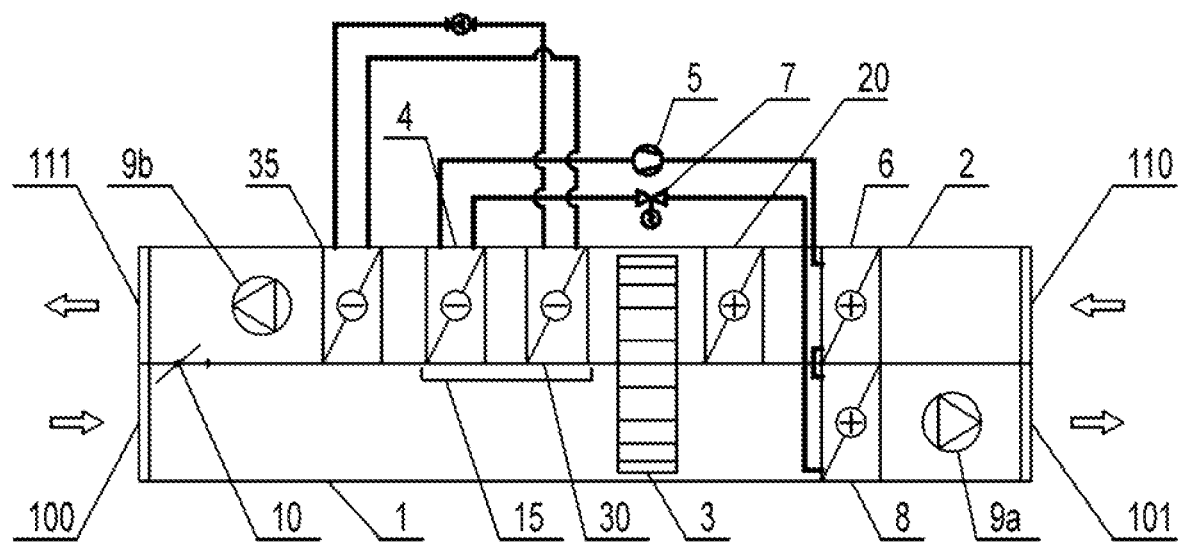
FIG. 3 is a schematic cross-sectional view of another possible embodiment of the main body of the apparatus in which the direct interconnection by a liquid pipe of the third liquid-to-air exchanger 35 to the second air-to-liquid exchanger 30 is shown.

In addition to the embodiments according to FIGS. 1, 2 and 3, there are many other embodiments that fall within the scope of the present disclosure.

For example, the refrigerant piping with the compressor 5 and the expansion valve 7 may, in another exemplary embodiment, be located in the air ducts 1 and 2 or in one of them. The subcooler 8 may be located in the air duct 1 for the process air, but also outside it, e.g., in conjunction with some other heat storage device.

INDUSTRIAL APPLICABILITY

The apparatus, according to the present disclosure, can be used to extract water from the air in a low specific humidity environment. The greatest potential for use is in dry, warm desert areas, where the apparatus allows, with the same energy requirements, multiple times higher water production than conventional condensing equipment. However, the apparatus can be used to extract water from air even in the temperate climate zone, with multiple times higher energy efficiency of the water production. At the same time, it is possible to achieve the autonomous operation of the apparatus by installing supplementary elements without the need to use non-renewable energy sources.

LIST OF REFERENCE SIGNS

1—Air duct for the process air
2—Air duct for the regeneration air
3—Sorption exchanger
4—Cooler
5—Compressor
6—Heater
7—Expansion valve
8—Subcooler
9a—First suction device
9b—Second suction device
10—Flap
15—Element for the water collection
20—First liquid-to-air heat exchanger
21—Heat accumulator
22—Solar thermal collector
23—Glazed solar photovoltaic-thermal collector
30—Second air-to-liquid heat exchanger
31—Cold accumulator
32—Outdoor liquid cooler
33—Large surface plate heat exchanger
34—Unglazed solar photovoltaic-thermal collector
35—Third liquid-to-air exchanger
40—Battery storage unit
100—Process air inlet
101—Process air outlet
110—Regeneration air inlet
111—Regeneration air outlet

What is claimed is:

1. An apparatus for extracting water from ambient air comprising:

two air ducts including an air duct for process air and an air duct for regeneration air, wherein the air duct for the process air has a process air inlet at one end of the air duct for the process air and a process air outlet at another end of the air duct for the process air, wherein the air duct for the regeneration air has a regeneration air inlet at one end of the air duct for the regeneration air and a regeneration air outlet at another end of the air duct for the regeneration air, and wherein the process air inlet, the process air outlet, the regeneration air inlet and the regeneration air outlet are connected to ambient environment;

a sorption exchanger positioned at least partially in at least one of the two air ducts and is movable in such a manner that at least a portion of a volume of the sorption exchanger is transferable between the two air ducts, wherein, in both of the two air ducts, a space for the sorption exchanger is allocated for placing the sorption exchanger;

a first suction device located in the air duct for the process air;

a second suction device located in the air duct for the regeneration air in the air duct for the regeneration air, a heater for heating the regeneration air and a cooler configured to have a surface temperature below a dew point for cooling the regeneration air, the heater and the cooler being positioned in such a manner that the space for the sorption exchanger is located between the heater and the cooler, and the second suction device is located anywhere in the air duct for the regeneration air in such a manner that the second suction device is configured to draw air in a first direction from the heater to the cooler;

an element for collection of water condensed from the regeneration air;

a closed refrigerant circuit including a refrigerant and refrigerant piping, wherein the cooler for cooling the regeneration air is a refrigerant evaporator, and the cooler is interconnected by the refrigerant piping via a compressor for suction and compression of the evaporated refrigerant, with the heater for heating the regeneration air, wherein the heater for heating the regeneration air is a condenser for condensing refrigerant vapor; and a subcooler for additional heat removal from the refrigerant, the subcooler being connected to the heater via the refrigerant piping and also being connected through an expansion valve to the cooler via the refrigerant piping.

2. The apparatus for extracting water from ambient air according to claim 1, wherein the air duct for the regeneration air is oriented in such a manner that the regeneration air inlet is closer to the process air outlet than to the process air inlet, and the first suction device is located in the air duct for the process air in such a manner that the first suction device is configured to draw air in a second direction from the process air inlet to the process air outlet and the second suction device is located in the air duct for regeneration air in such a manner that the second suction device is configured to draw air in a third direction from the regeneration air inlet to the regeneration air outlet.

3. The apparatus for extracting water from ambient air according to claim 1, wherein the air duct for process air is connectable with the air duct for the regeneration air by a connecting part, the connecting part comprising an openable flap for diverting air flow from the air duct for the regeneration air into the air duct for the process air,
wherein the connecting part with the flap opens into the air duct for the regeneration air in an area between the cooler and the regeneration air outlet,
wherein the connecting part with the flap opens into the air duct for the process air in an area between the space for the sorption exchanger and the process air inlet,
wherein the apparatus further comprises a measuring device for measuring water vapor content in both of the two air ducts, is the measuring device being further interconnected to a device for opening and closing the flap, the measuring device being connected in such a manner that the measuring device measures water vapor content in the air duct for the regeneration air between the cooler and the regeneration air outlet and in the air duct for the process air in the process air inlet,
wherein the regeneration air outlet is closable and is interconnected with a control device for opening and closing the regeneration air outlet, said control device for opening and closing the outlet being, directly or through other elements, interconnected with the device for opening and closing the flap or being interconnected with the measuring device for measuring water vapor content in both of the two air ducts.

4. The apparatus for extracting water from ambient air according to claim 1, further comprising a liquid and a liquid piping, wherein the liquid piping is separated from the refrigerant piping.

5. The apparatus for extracting water from ambient air according to claim 4, wherein a first liquid-to-air heat exchanger is inserted in the air duct for the regeneration air and is located, in a direction of the air flow, downstream of the heater, said first liquid-to-air heat exchanger being further connected by the liquid piping to a heat accumulator.

6. The apparatus for extracting water from ambient air according to claim 5, wherein solar thermal collectors and/or glazed solar photovoltaic-thermal collectors are connected to the heat accumulator by a liquid piping, wherein, in a case when the glazed solar photovoltaic-thermal collectors are present, the glazed solar photovoltaic-thermal collectors are electrically interconnected with a battery storage unit.

7. The apparatus for extracting water from ambient air according to claim 4, wherein a second air-to-liquid heat exchanger is inserted into the air duct for the regeneration air and is located, in the direction of the air flow, downstream of the space for the sorption exchanger and concurrently upstream of the cooler, wherein the second air-to-liquid heat exchanger is connected by the liquid piping to a cold accumulator.

8. The apparatus for extracting water from ambient air according to claim 7, wherein the cold accumulator is connected by the liquid piping to an outdoor liquid cooler and/or to large surface plate heat exchangers and/or to unglazed solar photovoltaic-thermal collectors, wherein, in a case when unglazed solar photovoltaic-thermal collectors are present, the unglazed solar photovoltaic/thermal collectors are concurrently electrically interconnected to a battery storage unit.

9. The apparatus for extracting water from ambient air according to claim 7, wherein a third liquid-to-air exchanger is inserted in the air duct for the regeneration air downstream of the cooler in the direction of the airflow, said third liquid-to-air exchanger being connected to the cold accumulator by the liquid piping or directly to the second air-to-liquid heat exchanger.

10. The apparatus for extracting water from ambient air according to claim 1, wherein a power of the second suction device is lower than a power of the first suction device.

11. The apparatus for extracting water from ambient air according to claim 1, wherein the subcooler is located in the air duct for the process air between the space for the sorption exchanger and the process air outlet.

12. The apparatus for extracting water from ambient air according to claim 1, wherein the first suction device is located between the space for the sorption exchanger and the process air outlet and the second suction the device is located between the cooler and the regeneration air outlet, and wherein in a case when a third liquid-to-air exchanger is present, the second suction device is located in the direction of the air flow, downstream of the third liquid-to-air exchanger and concurrently upstream of the regeneration air outlet.

13. The apparatus for extracting water from ambient air according to claim 1, wherein the sorption exchanger is rotary.

14. The apparatus for extracting water from ambient air according to claim 1, wherein the element for the collection of the condensed water from the regeneration air on the cooler is a condensed water collecting vessel located below the cooler and/or below the second air-to-liquid heat exchanger.

15. The apparatus for extracting water from ambient air according to claim 10, wherein the power of the second suction device is equal to one half to one quarter of the power of the first suction device.

* * * * *